US009657989B2

(12) United States Patent
Johnson et al.

(10) Patent No.: US 9,657,989 B2
(45) Date of Patent: May 23, 2017

(54) SYSTEMS AND METHODS FOR PROCESSING MUNICIPAL WASTEWATER TREATMENT SEWAGE SLUDGE

(75) Inventors: Bruce Johnson, Indianhead Park, IL (US); Nina Cunningham, Warrenville, IL (US); Michael C. Mensinger, Darien, IL (US)

(73) Assignee: WasteDry, LLC, Chicago, IL (US)

( * ) Notice: Subject to any disclaimer, the term of this patent is extended or adjusted under 35 U.S.C. 154(b) by 899 days.

(21) Appl. No.: 13/452,678

(22) Filed: Apr. 20, 2012

(65) Prior Publication Data

US 2012/0200092 A1 Aug. 9, 2012

Related U.S. Application Data

(63) Continuation-in-part of application No. 12/209,927, filed on Sep. 12, 2008.

(60) Provisional application No. 61/043,062, filed on Apr. 7, 2008.

(51) Int. Cl.
| F26B 23/02 | (2006.01) |
| F23G 5/027 | (2006.01) |
| F23G 5/04 | (2006.01) |
| F23G 5/16 | (2006.01) |

(52) U.S. Cl.
CPC ............ *F26B 23/028* (2013.01); *F23G 5/027* (2013.01); *F23G 5/04* (2013.01); *F23G 5/16* (2013.01); *F26B 2200/18* (2013.01); *Y02E 20/12* (2013.01); *Y02P 80/21* (2015.11)

(58) Field of Classification Search
USPC ....................................................... 110/210
See application file for complete search history.

(56) References Cited

U.S. PATENT DOCUMENTS

| 3,954,069 A | * | 5/1976 | Loken ........................... 110/221 |
| 4,054,424 A | | 10/1977 | Staudinger et al. |
| 4,311,103 A | * | 1/1982 | Hirose .......................... 110/238 |
| 4,466,361 A | | 8/1984 | Henery et al. |
| 4,917,023 A | | 4/1990 | Jones |
| 4,930,429 A | | 6/1990 | Ryham |
| 5,171,552 A | * | 12/1992 | Miura et al. ................... 110/345 |
| 5,230,211 A | * | 7/1993 | McMahon et al. ........... 110/346 |
| 5,261,602 A | | 11/1993 | Brent et al. |
| 5,428,906 A | | 7/1995 | Lynam et al. |
| 6,216,610 B1 | * | 4/2001 | Brunnmair .............. F23G 5/165 110/208 |
| 6,256,902 B1 | | 7/2001 | Flaherty et al. |

(Continued)

OTHER PUBLICATIONS

A. van der Drift and H. Boerrigter, "Synthesis Gas from Biomass for fuels and chemicals" (2006).
Jared P. Ciferno and John J. Marano, "Benchmarking Biomass Gasification Technologies for Fuels, Chemicals and Hydrogen Production" (Jun. 2002).

(Continued)

*Primary Examiner* — David J Laux
(74) *Attorney, Agent, or Firm* — Reed Smith LLP

(57) ABSTRACT

The present invention relates to methods and systems for processing sewage sludge using a gasification process. The gasification process takes place at high temperatures in an oxygen-starved environment, which enables carbon-containing materials in the sewage sludge to chemically react under the preferred temperature and oxygen levels, resulting in the formation of usable products, including ash, electricity, and syngas—all of which are generally environmentally benign.

29 Claims, 5 Drawing Sheets

(56) References Cited

U.S. PATENT DOCUMENTS

| | | | |
|---|---|---|---|
| 6,398,921 B1* | 6/2002 | Moraski | C02F 1/302 110/346 |
| 6,410,283 B1 | 6/2002 | Rehmat et al. | |
| 6,558,454 B1 | 5/2003 | Chang et al. | |
| 7,241,322 B2 | 7/2007 | Graham | |
| 7,294,314 B2 | 11/2007 | Graham | |
| 7,762,317 B2 | 7/2010 | Graham | |
| 7,793,601 B2 | 9/2010 | Davison et al. | |
| 7,976,593 B2 | 7/2011 | Graham | |
| 2004/0020415 A1* | 2/2004 | Oh | F23G 7/001 110/346 |
| 2005/0145578 A1* | 7/2005 | Childs | F26B 23/028 210/768 |
| 2006/0196398 A1 | 9/2006 | Graham | |
| 2007/0012232 A1 | 1/2007 | Skrypski-Mantele et al. | |
| 2007/0251433 A1 | 11/2007 | Rabiner | |
| 2008/0118310 A1 | 5/2008 | Graham | |
| 2008/0209807 A1 | 9/2008 | Tsangaris et al. | |
| 2009/0000301 A1 | 1/2009 | Graham | |
| 2009/0249641 A1 | 10/2009 | Graham et al. | |
| 2013/0195727 A1 | 8/2013 | Bull et al. | |

OTHER PUBLICATIONS

James P. Bennett, "Refractory Liner Materials Used in Slagging Gasifiers," 9 (5): Refractories Applications and News 20-25 (2004).
U.S. Department of Energy, A Comparison of Gasification and Incineration of Hazerdous Wastes—Final Report (Mar. 30, 2000).
Testo, "Flue Gas in Industry" (2004).
Jones, Jerry, "Converting solid wastes and residues to fuel" Chemical Engineering, Jan. 2, 1978, pp. 87-94.
Jones, Jerry, "Pyrolysis, Thermal Gasification, and Liquefaction of Solid Wastes and Residues" Worldwide Status of Processes (as of Fall 1977), pp. 387-396.
Klass, Donald L., "Energy From Biomass and Wastes" Institute of Gas Technology, Sep. 1978, pp. 1-27.
"Chapter 11: High Temperature Processess"Process Design Manual for Sludge Treatment and Disposal, Sep. 1979.
"Gasification—The Waste-to-Energy Solution": Gasification Technologies Council, www.Gasification.org Copyright GTC 2011.
Fericelli, D. Paul "Comparison of Sludge Treatment by Gasification vs. Incineration" 9th Latin American and Caribbean Conference for Engineering and Technology, Dated: Aug. 3-5, 2011.
"EPA Ruling on Sludge Gasification Process Opens Doors to Environmentally Beneficial Waste Treatment Technology" : PR Newswire, A UBM Company, www.prnewswire.com: Jan. 2, 2014.

* cited by examiner

SYSTEMS AND METHODS FOR PROCESSING MUNICIPAL WASTEWATER TREATMENT SEWAGE SLUDGE

This application is a continuation-in-part of U.S. patent application Ser. No. 12/209,927, filed on Sep. 12, 2008, which claims priority to U.S. Provisional Patent Application No. 61/043,062, filed on Apr. 7, 2008. Both of these applications are incorporated by reference in their entirety.

FIELD OF THE INVENTION

The present invention relates to methods and systems for processing sewage sludge using a gasification process. The gasification process takes place at high temperatures in an oxygen-starved environment, which enables carbon-containing materials in the sewage sludge to chemically react under the preferred temperature and oxygen levels, resulting in the formation of usable products, including ash, electricity, and syngas—all of which are generally environmentally benign.

BACKGROUND OF THE INVENTION

Description of the Related Art

The primary problem facing many municipal wastewater treatment facilities is the cost-effective, energy-efficient, and environmentally-sound disposal of sewage sludge (i.e., the end product of wastewater processing). Part of the problem is the sheer volume of sewage sludge produced. For example, North America produces about 0.21 pounds (on a dry basis) of sewage sludge daily for every man, woman, and child. There are approximately 16,000 municipal wastewater treatment plants in the United States, with more being built each year to accommodate the growing population base. The Environmental Protection Agency (EPA) estimates that these plants alone generate about 7-8 million dry tons of sewage sludge per year.

Because of this growing problem, a large number of states have imposed site restrictions or management practices governing wastewater treatment and sewage sludge disposal. For example, Maryland includes sewage sludge in its definition of "biosolids" and has a Sewage Sludge Task Force, which establish and monitor the regulatory requirements for the utilization of sewage sludge. In another example, New Jersey has a Bureau of Pretreatment and Residuals, which monitors sewage sludge production. In still another example, New York has passed regulations directed at facilities and methods for composting sewage sludge.

The federal government has also addressed these problems in the Clean Air Act, as amended in 1990. The Clean Air Act governs sewage sludge incineration and the disposal of its residual ash by imposing, among other things, strict air emission measures for incineration. In 1993, the EPA published 40 C.F.R. Part 503 Sludge Regulations (503 Regulations), which set forth the EPA's "exceptional quality" sewage sludge program. The 503 Regulations established "Standards for the Use or Disposal of Sewage Sludge" applicable to all wastewater treatment facilities. The 503 Regulations also established requirements for the final use or disposal of sewage sludge when sewage sludge is applied to land to condition the soil, fertilize crops or other vegetation, placed on a surface disposal site for final disposal, or fired in a sewage sludge incinerator. The 503 Regulations further provided that, if sewage sludge is placed in a municipal solid waste landfill, the provisions of 40 C.F.R. Part 258 must be met. These provisions cover all aspects of establishing, maintaining, and monitoring such landfills. Because of these restrictions, many communities have been pursuing alternatives to incineration and landfilling.

Under the 503 Regulations the EPA considers sewage sludge products that meet stringent requirements [(e.g., sufficiently low concentrations of certain pathogens and pollutants and minimal attractiveness to disease vectors (e.g., insects and rodents)] to be Class A, "Exceptional Quality" sewage sludge. The EPA treats Class A sewage sludge in the same manner as common fertilizers. Thus, this material is exempt from federal restrictions on their agricultural use or land application.

Sewage sludge falling short of the highest EPA standards under a Class A designation can nevertheless qualify as Class B sewage sludge. Sewage sludge that meets Class B requirements can also be applied to the land for beneficial re-use, but is subject to greater record keeping, reporting requirements and restrictions governing the type, location, and volume of application. Sewage sludge applied to the land for agricultural use must meet Class B pathogen levels and, if applied in bulk, requires an EPA permit. Although land application for beneficial re-use has been one of the best disposal alternatives, there are still drawbacks (e.g., substantial fuel and personnel costs, odor complaints from neighbors, and wear-and-tear on roads). In addition, some cold weather climates have restricted land application of sludge during the winter months. Other requirements include restricted public access, run-off and leachate collection systems, methane monitoring systems, and monitoring and/or limiting pollutant levels.

Turning to methods for processing sewage sludge, public and private communities have been processing sewage sludge for many years and several methods have developed over time. Those methods have included recent advances in technology and have resolved growing global pollution problems. Generally, the first step in the process of treating sewage sludge is mechanically drying the sludge at a municipal wastewater treatment plant. The sewage sludge is dried to a wet cake before further processing, transportation to an off-site disposal area, or re-use.

Drying the wet sewage sludge, however, presents a number of challenges. Common challenges associated with processing the sewage sludge are the enormous volume and the excessive cost. Annual costs for processing this waste can exceed approximately five billion dollars. That cost is incurred processing the estimated 28-32 million tons of wet sewage sludge cake each year by municipal wastewater treatment plants.

Another challenge to drying or removing moisture from the sewage sludge is the energy required to process the usually pasty, sticky, gelatinous, and difficult-to-handle sludge. Typically, wet sewage sludge is processed to a solid cake having about 20%-35% moisture through mechanical dewatering methods (e.g., centrifugation and filter pressing), and this process requires vast amounts of energy. This application of energy is generally in the form of applying heat to the sludge, which dries the sludge to a desired moisture level.

The current state of thermal-drying technology in the wastewater treatment industry is dominated by two heat drying technologies: direct and indirect drying. Direct drying technology places hot air in direct contact with the sewage sludge during the drying process. Indirect drying technology causes the sewage sludge to come into direct contact with a heated surface, as opposed to direct hot air.

For example, U.S. Pat. No. 6,256,902, incorporated by reference in its entirety, describes one system for drying wastewater sewage sludge.

After the sewage sludge is dried, it must be disposed of in some fashion. Historically, municipal sewage sludge management disposal programs relied upon a variety of disposal methods. These methods include land filling, surface disposal, incineration, ocean dumping (banned in the United States in 1992), and/or beneficial re-use through land application. While each of these methods are relatively inexpensive, each has undesirable aspects which result in a negative long-term cost to the environment.

In order to dispose of the dried sludge, wastewater treatment centers transport a large portion of sewage sludge to landfills, where the sewage sludge is then buried. Because valuable landfill space has been significantly reduced and sewage sludge has an undesirable odor and quality, much of the sewage sludge produced in states within the U.S. is now hauled a considerable distance to its final disposition. For example, over 75% of New York City's sludge is hauled to places as far away as Colorado and Texas.

Sewage sludge can also be beneficially applied on agricultural land, forest land, reclamation sites, golf courses, public parks, roadsides, plant nurseries and home land and gardens. Like the transport of sewage sludge for landfill burial, sewage sludge for land application can also be transported over long distances. For example, Portland, Oreg. trucks approximately 75,000 tons per year over 200 miles to Hermiston, Oreg. to be land-applied for beneficial re-use. Also like landfill applications, there are problems associated with odor, health issues, contaminants, and transportation costs for beneficial land application.

Wastewater treatment plants often transport another substantial portion of the sewage sludge in the United States to surface disposal sites. Surface disposal sites include monofills, surface impoundments, lagoons, waste piles, and dedicated disposal sites. Surface disposal differs from land application in that the sewage sludge that is surface disposed is merely placed on the surface of the land, rather than applied to enrich nutrient-depleted or barren soil.

Another problem common to landfills, surface disposal, and land application is that proposals to surface dispose and land-apply wet sewage sludge have been met with great resistance from the public in both large metropolitan areas and rural communities alike. Factors affecting the acceptance of land-application include local geography, climate, odors, contaminants, land use, transportation costs, and regulatory constraints.

Another widely used method of sewage sludge disposal is incineration. Incineration literally means "to render to ash" and is a high-temperature process that has been used since the 1900's. Generally, incineration is a waste treatment process where organic substances in sewage sludge are combusted into several products. In some instances incineration may produce useful products, including ash and electric power.

Generally, the incineration process uses municipal solid waste (MSW) and/or sewage sludge as fuel. When doing so the fuel is burned with high volumes of air to form carbon dioxide and heat. While incineration can take place at lower than atmospheric oxygen levels, some level of oxygen is still generally required for complete incineration. The heat from the incineration process can then be used to make steam, which, in turn, can be used to generate electricity.

Incineration is well known to have several negative drawbacks associated with expelling pollution into the atmosphere. In addition, incineration emissions are worsening over time. The process of incineration forms (and allows re-formation of) toxic dioxins, furans, and other toxic chemicals. Notably dioxins (polychlorinated dibenzo dioxins), furans (polychlorinated dibenzo furans), and polychlorinated biphenyls (PCBs) are part of a group of chemicals known as persistent organic pollutants. These chemicals can be extremely dangerous because they are lipophilic (i.e., absorbed by and stored in fat tissue) and have half-lives of several years due to their relative chemical stability. These toxic chemicals are produced during incineration and end up in exhaust streams of incineration plants by decomposition, "re-formation" (smaller molecules combining together), or passage through the incineration process unchanged. Incineration does not often control the production of these dangerous chemicals and they must be cleaned up, removed, or otherwise processed after incineration is complete. Further, while ash produced by incineration is generally assumed to be safe as landfill cover, there is concern with its safety when used for commercial products.

Gasification is a method of sewage sludge disposal separate and distinct from incineration. In the gasification process the sewage sludge is not a fuel, but a feedstock for a high temperature chemical conversion process. In the gasifier, the sewage sludge is not burned, but reacts with little or no oxygen, breaking down the carbon-containing materials in the feedstock into simple molecules and converting them into syngas. Instead of producing just heat and electricity, as is done in a waste-to-energy plant using incineration methods, the syngas produced by gasification can be turned into more valuable commercial products such as transportation fuels, chemicals, and fertilizers. Thus, while heat is employed in the treatment of sewage sludge for both incineration and gasification, the required process parameters are different, and thus, the resulting products (e.g., syngas) are different as well.

Gasification further differs from incineration in at least the aspects:

In the high temperature environment used for gasification, larger molecules such as plastics are completely broken down into the components of syngas, which can be cleaned and processed before any further use;

Dioxins and furans need sufficient oxygen to form or re-form, yet the oxygen-deficient atmosphere in a gasifier does not provide the environment needed for dioxins and furans to form or re-form;

Dioxins need fine metal particulates in the exhaust to reform, yet syngas from gasification is typically cleaned of particulates before being used;

In gasification facilities that use syngas to produce downstream products (e.g., fuels, chemicals and fertilizers), the syngas is quickly quenched, so that there is insufficient residence time within the temperature range for dioxins or furans to re-form; and When syngas is primarily used as a fuel for making heat, it can be cleaned as necessary before combustion, yet this cleansing cannot occur in incineration.

Further, the ash produced from gasification differs from the ash produced from incineration. While incinerator ash is presumed safe for use as alternative daily cover on landfills, concerns persist with respect to its use in commercial products. In high-temperature gasification, the ash can flow from the gasifier in a molten form, where it can be quench-cooled to form a glassy, non-leachable slag. This slag can be used for making cement, roofing shingles, or used as an asphalt filler or for sandblasting.

Gasification technologies offer an alternative process for the recovery and recycling of low-value materials by producing a more valuable commodity (i.e., syngas). The multiple uses of syngas (e.g., power production, chemicals, 5-30 methanol) and the availability of gas cleanup technologies common to the petroleum refining industry make gasification of secondary oil-bearing materials a valuable process, enabling the extraction of products from petroleum. Moreover, gasification can be used to recover melted metals in a separate stream. Those metals can be later recycled. By producing syngas, metal-bearing slag suitable for reclamation, and other products (e.g., sulfur), wastes are minimized and the emissions associated with their destruction by incineration are reduced.

Several industry articles discuss these and other differences between incineration and gasification, including for example: Jones, J, *Converting solid wastes and residues to fuel*, 85(1) Chemical Engineering 87-94, 88 (1978); *The Process Design Manual for Sludge Treatment and Disposal* Chapter 11, *High Temperature Processes*, 11-1-11-149 (1979), and Jones, J., *Converting solid wastes and residues to fuel*, 85(1) Chemical Engineering 87-94, 88 (1978).

In addition to incineration, many communities have experimented with other new treatment technologies for removing the moisture from sewage sludge and further downstream processing. These methods include, for example, ultrasonic, microwave, adapted plate and frame technologies, and radiant heat processes. While these methods have been developed for small-scale operations, these new technologies fail to meet the high-volume sewage sludge-processing needs of the major wastewater treatment facilities. Indeed, most wastewater treatment facilities are still searching for an economical, energy-efficient, and environmentally-sound technology that dries municipal sewage sludge and recycles its intermediate and end products.

Thus, a need still exists for improved methods of handling sewage sludge, because incineration and other known methods have failed to effectively address the above-identified problems. The desire exists to identify or alter and improve a process for treating sewage sludge that efficiently consumes, if not produces, energy. Such a process will likely be cost- and time-efficient and effective, resulting in the production of fewer harmful by-products and pollutants.

SUMMARY OF THE INVENTION

The methods and systems consistent with the present invention provide improved methods of processing sewage sludge. These methods are more cost-efficient and result in fewer and less noxious and toxic by-products by utilizing the principles of recycling and energy recovery, thereby reducing the costs of treating the sewage sludge and handling the levels and amounts of by-products of the process.

In one embodiment, the invention relates to a method for processing sewage sludge comprising drying a first batch of sewage sludge with carbon-containing materials to form a first partially dried sewage sludge; gasifying a portion of the first partially dried sewage sludge into a gaseous fuel in a heated, oxygen-starved environment; and combusting the gaseous fuel in a low NOx oxidizer to produce a hot flue gas. During gasification, the carbon-containing materials in the first partially dried sewage sludge chemically react to produce the gaseous fuel. Gasification allows for the production of electric power using the hot flue gas. In addition, air can be heated with the hot flue gas, and this heated air can be used to dry a second batch of sewage sludge to form a second partially dried sewage sludge. The drying process can be a direct or indirect.

In another embodiment, gasification of the sewage sludge takes place in an oxygen-starved environment from about 0% to about 40% oxygen, or the oxygen-starved environment can contain from about 0% to about 10% oxygen, or from about 0% to about 5% oxygen. Alternatively, because the level of oxygen-starvation can vary between locations, materials undergoing gasification, and even by season, the term "oxygen-starved" is a level of oxygen that is insufficient to completely combust the material being subjected to gasification.

In yet another embodiment, gasification of the sewage sludge can be performed at a temperature of from about 1100° F. to about 2500° F., and preferably from about 1200° F. to about 1500° F. Alternatively, the temperature can be selected from about 1100° F., about 1200° F., about 1500° F., about 2350° F., and about 2450° F. Gasification at each of these temperatures allows for differing gasification products to be produced.

In still another embodiment, the method can include the destruction of volatile organic compounds (VOCs) and/or residual pathogens that might be found in the hot flue gas. In addition, SOx (sulfur-containing compounds) levels in the flue gas can be reduced, preferably by the injection of lime into the flue gas. Other particulate emissions produced by the gasification process can also be reduced.

In another embodiment, the invention relates to the release of a moisture-laden gas stream during the drying of sewage sludge. The moisture can be condensed from the gas stream, along with VOCs, thus producing a condensed liquid. This liquid can then be fed to a waste water treatment plant.

In another embodiment, the invention relates to a method for processing a sewage sludge composition comprising digesting a first batch of sewage sludge comprising carbon containing materials; drying the first batch of sewage sludge to form a first partially dried sewage sludge; gasifying a portion of the first partially dried sewage sludge into a gaseous fuel in a heated, oxygen-starved environment; and combusting the gaseous fuel in a low NOx oxidizer to produce a hot flue gas. During gasification, the carbon-containing materials in the first partially dried sewage sludge chemically react to produce the gaseous fuel.

As described above, the gasification process allows for the production of electric power using the hot flue gas. In addition, air can be heated with the hot flue gas and this heated air can be used to dry a second batch of sewage sludge to form a second partially dried sewage sludge. The drying process can be a direct or indirect drying process.

In another embodiment, gasification of the sewage sludge takes place in an oxygen-starved environment from about 0% to about 40% oxygen. Preferably, the oxygen-starved environment can contain from about 5% to about 10% oxygen.

In yet another embodiment, gasification of the sewage sludge can be performed at a temperature of from about 1100° F. to about 2500° F., and preferably from about 1200° F. to about 1500° F. Alternatively, the temperature can be selected from about 1100° F., about 1200° F., about 1500° F., about 2350° F., and about 2450° F. Gasification at each of these temperatures allows for different gasification products to be produced.

In still another embodiment, the method can include the destruction of VOCs and/or residual pathogens that might be found in the hot flue gas. In addition, SOx levels in the flue gas can be reduced, preferably by the injection of lime into the flue gas. Other particulate emissions produced by the gasification process can also be reduced.

In another embodiment, the invention relates to the release of a moisture-laden gas stream during the drying of sewage sludge. The moisture can be condensed from the gas stream, along with VOCs, thus producing a condensed liquid. This liquid can then be fed to a waste water treatment plant.

In another embodiment, the invention relates to a system for processing sewage sludge comprising a dryer for partially drying the sewage sludge; a gasifier for converting partially dried sewage sludge into a gaseous fuel; and an oxidizer for combusting the gaseous fuel to produce heat, wherein the heat is used to directly or indirectly partially dry the sewage sludge in the dryer. The oxidizer can be a low NOx oxidizer.

In another embodiment, the system can also comprise a pathogen destruction furnace for destroying volatile organic compounds and/or residual pathogens released from the sewage sludge. The system can also further comprise a lime injection system for reducing SOx in the pathogen destruction furnace.

Other systems, methods, features, and advantages of the present invention will become apparent to one with skill in the art upon examination of the following figures and detailed description. This description and the scope of the invention include all such additional systems, methods, features, and advantages and be protected by the accompanying claims.

BRIEF DESCRIPTION OF THE FIGURES

The accompanying drawings, which are incorporated in and constitute a part of this specification, illustrate an implementation of the present invention. The drawings, together with the description, serve to explain the advantages and principles of the invention. In the drawings.

DETAILED DESCRIPTION OF THE INVENTION

Figure 1:
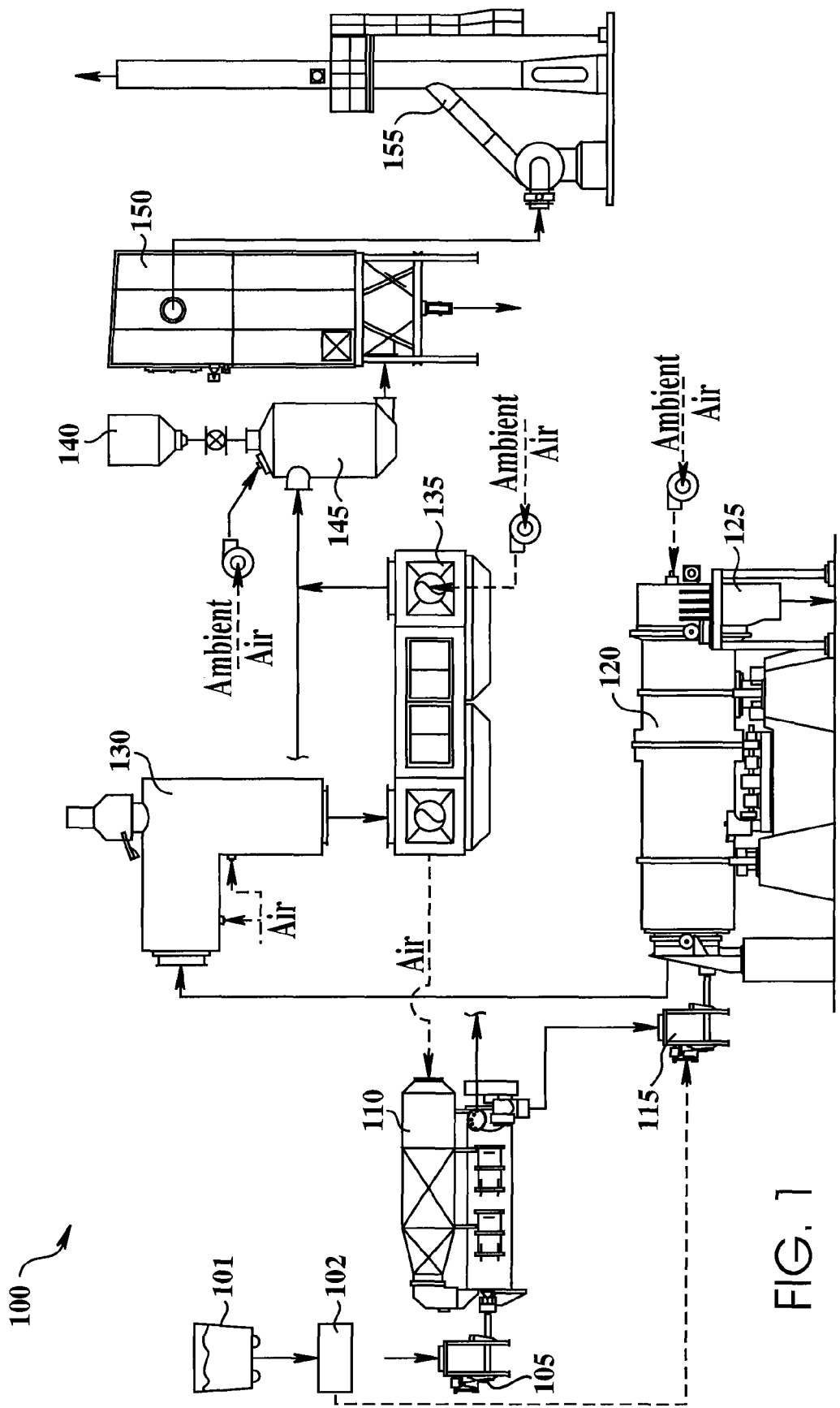
FIG. 1 depicts an overview of one embodiment of a system for drying and gasification of sewage sludge in accordance with the present invention. Dotted lines indicate air flow, either as ambient air or air flow into or between system components.

While gasification has been known for some years, Applicants have surprisingly discovered a useful gasification process that is highly efficient and able to produce excellent electric power levels without a concomitant increase in pollution levels. Specifically, the inventive systems and methods use temperature and oxygen levels that allow for unexpectedly high electric power production and low pollution levels.

Methods and systems consistent with the present invention allow for processing sewage sludge compositions in a manner that is efficient and generates only small amounts of solid waste or air pollutants. In addition to drying the sewage sludge, these methods and systems also recover the energy from and beneficially re-use the products that result from the drying of such materials.

In one embodiment, the invention relates to a method for processing sewage sludge comprising drying a first batch of sewage sludge comprising carbon-containing materials to form a first partially dried sewage sludge; gasifying a portion of the first partially dried sewage sludge into a gaseous fuel in a heated, oxygen-starved environment; and combusting the gaseous fuel in a low NOx oxidizer to produce a hot flue gas. During the gasification process, the carbon-containing materials in the first partially dried sewage sludge chemically react to produce the gaseous fuel. The gasification process allows for the production of electric power using the hot flue gas. In addition, air can be heated with the hot flue gas, and this heated air can be used to dry a second batch of sewage sludge to form a second partially dried sewage sludge. The drying process can be a direct or indirect drying process.

In another embodiment, gasification of the sewage sludge takes place in an oxygen-starved environment from about 0% to about 40% oxygen. Preferably, the oxygen-starved environment can contain from about 5% to about 10% oxygen.

In yet another embodiment, gasification of the sewage sludge can be performed at a temperature of from about 1100° F. to about 2500° F., and preferably from about 1200° F. to about 1500° F. Alternatively, the temperature can be selected from about 1100° F., about 1200° F., about 1500° F., about 2350° F., and about 2450° F. Gasification at each of these temperatures allows for the production of different gasification products.

In another embodiment, the invention relates to a method for processing a sewage sludge composition comprising digesting a first batch of sewage sludge comprising carbon containing materials; drying the first batch of sewage sludge to form a first partially dried sewage sludge; gasifying a portion of the first partially dried sewage sludge into a gaseous fuel in a heated, oxygen-starved environment; and combusting the gaseous fuel in a low NOx oxidizer to produce a hot flue gas. During gasification, the carbon-containing materials in the first partially dried sewage sludge chemically react to produce the gaseous fuel.

As above, the gasification process allows for the production of electric power using the hot flue gas. In addition, air can be heated with the hot flue gas and this heated air can be used to dry a second batch of sewage sludge to form a second partially dried sewage sludge. The drying process can be direct or indirect.

In another embodiment, gasification of the sewage sludge takes place in an oxygen-starved environment from about 0% to about 40% oxygen. Preferably, the oxygen-starved environment can contain from about 5% to about 10% oxygen.

In yet another embodiment, gasification of the sewage sludge can be performed at a temperature of from about 1100° F. to about 2500° F., and preferably from about 1200 F. to about 1500 F. Alternatively, the temperature can be selected from about 1100° F., about 1200° F., about 1500° F., about 2350° F., and about 2450° F. Gasification at each of these temperatures allows for the production of different gasification products.

Gasification can take place in a variety of different gasifier types. For example, the gasifier can be, but is not limited to, a fixed bed gasifier, a moving bed gasifier, a rotary kiln gasifier, a fluidized bed gasifier, an upflow gasifier, and a downflow gasifier. One skilled in the art would know which type of gasifier to select based upon the desired products, equipment availability, and/or the moister level of the sludge itself.

In another embodiment, the invention relates to a system for processing sewage sludge, comprising a dryer for partially drying the sewage sludge; a gasifier for converting partially dried sewage sludge into a gaseous fuel; and an oxidizer for combusting the gaseous fuel to produce heat, wherein the heat is used to directly or indirectly partially dry the sewage sludge in the dryer. The oxidizer can be a low NOx oxidizer.

In another embodiment, the system can also comprise a pathogen destruction furnace for destroying volatile organic compounds and/or residual pathogens released from the sewage sludge. The system can also further comprise a lime injection system for reducing SOx in the pathogen destruction furnace. In addition, the system can comprise a temporary storage hopper, or container, as well as a crusher/comminutor and additional feeder(s) on a system-by-system basis.

Figure 2:
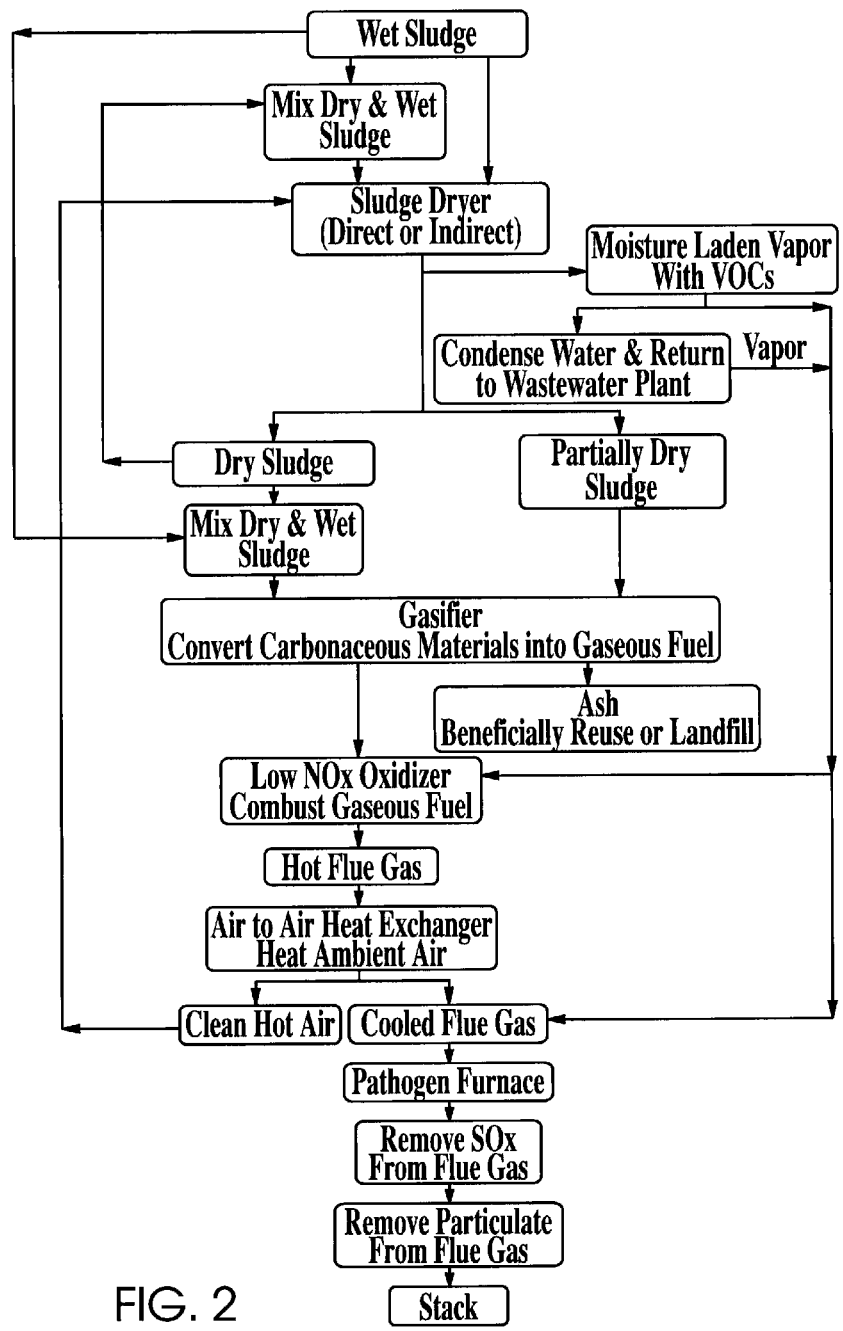
FIG. 2 depicts a flow diagram of the steps performed by the system in FIG. 1.

Turning to the Figures, FIG. 1 depicts a system 100 suitable for practicing the methods consistent with the present invention. The system includes first material feeder 105, a dryer 110, a second material feeder 115, a gasifier 120, an ash removal system 125 and storage tank (not shown), a low NOx oxidizer 130, an air-to-air heat exchanger 135, a lime injection system 140, a pathogen destruction furnace 145, an air pollution control device 150, and a stack for exhausting the treated, clean gas 155. The system 100 can also comprise a short-term sludge storage hopper 101, a crusher/comminutor 102, so that the process can be operated on a continuous basis without running out of the starting material. One skilled in the art will recognize that each material feeder 105, 115 can be of any type that is capable of moving wet or dry materials between two pieces of equipment, e.g., a belt or screw conveyor, or any other type of conveyor known in the art. Additional feeders (not shown) can also be included in the system. For example, an additional feeder can supply sewage sludge directly to the gasifier for gasification. Alternatively, a feeder can be used to mix wet sewage sludge with a portion of dried sewage sludge prior to further processing. The distances between the pieces of equipment depend upon the available space. The location and order of the system components and how they are used are described below, with reference to the flow diagram depicted in FIG. 2, illustrates one embodiment of the method used to process sewage sludge consistent with the present invention.

First, when dewatered digested sludge is delivered to the gasification facility, it is unloaded from the transport and loaded into the temporary storage hopper 101 prior to processing. An on-site sewage sludge storage hopper 101 can be provided to ensure a steady supply of sludge to the plant in the event of interrupted sludge delivery. However, the temporary storage hopper 101, the crusher/comminutor 102, and any additional feeders, while necessary for a continuous process flow, do not affect the gasification process itself.

The first material feeder 105 conveys wet sewage sludge into the dryer 110. The sewage sludge also can be pumped between locations, depending on the level of wetness of the material. The sewage sludge can be loaded into a hopper (e.g., a live bottom hopper) where it can be conveyed at a controlled rate to the feed hopper of the dryer. The conveyor distance can be about 25 feet or more, dependent upon the size and layout of the facility. The feed hopper can feed the material into the dryer 110 at a controlled rate through a rotary air lock device or any other device that allows for control of the feed rate.

In another embodiment, the sewage sludge can be digested prior to the drying step. Digestion of the sewage sludge is used to reduce the amount of organic matter, as well as the disease causing microorganisms, and can be carried out in a variety of ways. For example, digestion can be carried out using anaerobic digestion using bacteria that function without oxygen or with very low oxygen requirements. Other methods of digestion include aerobic digestion using bacteria that function by using air or oxygen, and composting. One skilled in the art would understand and employ such digestion techniques in the processing of sewage sludge because digestion begins the process of chemical breakdown of the compounds found in sewage sludge Dryer 110 partially dries the sewage sludge to reduce the moisture content of the sewage sludge from approximately 65-80% to about 25%-50%, preferably about 35%, depending upon the characteristics of the sludge. Alternatively, and further depending on the characteristics of the sludge, it can be dried to less than 10% moisture. The dryer 110 can be a rotary dryer, belt dryer, ring dryer, thermal screw auger, filter press, or any other dryer known in the art. The transit time in the dryer 110 can be from seconds in a ring-type dryer to about three to about six hours using a thermal screw auger. Rotary dryers 110 can process sewage sludge materials in a time frame between a ring dryer and a thermal screw auger dryer. The type of dryer 110 selected can relate to the volume of material to be processed, the physical characteristics of the material to be processed, and/or the rate at which the material is to be processed. The device can use direct heat (i.e., the drying air is in direct contact with the sewage sludge) or indirect heat where hot air, steam, oil or electricity is used to indirectly dry the material and does not come in direct contact with the sewage sludge.

In one embodiment, a portion of the partially dried sewage sludge exiting the dryer 110 can be conveyed back to the front of the dryer and mixed with the wet material to reduce the total moisture content of the material going into the dryer 110. Depending on the length and type of dryer, the length of the conveyor back to the front of the dryer can be approximately 40 to 50 feet. Alternatively, the length of the conveyor can be determined by the location and size of the plant. If this backmixing is performed, a mixing hopper can be required to mix the dry and wet materials together prior to conveying it to the feed hopper of the dryer 110.

Preferably, the material in the dryer 110 can be heated to a temperature sufficient to evaporate water in the sewage sludge material. This temperature may reach levels of about 212° F. to about 240° F., or about 220° F. to about 230° F., which is hot enough to boil off the water. The temperature of the heating medium (hot air, hot oil or steam) used to raise the temperature of the sewage sludge in the dryer 110 may be somewhat higher.

After the drying step, material feeder 115 conveys the partially dried sewage sludge to the gasifier 120. The partially dried sewage sludge can go into a feed hopper and be fed to the gasifier 120 through a rotary air lock device. The conveyor portion of the material feeder 115 will preferably be less than about 20 feet, or of any desirable length depending upon the layout and size of the plant. The gasifier 120 should receive about 55% to about 65% dry material (about 35% to about 45% moisture). However, the sewage sludge can become very sticky at this level of dryness. If the stickiness of the sewage sludge is too great, the material can be dried to about 90% dryness in the dryer 110, and mixed with wet material prior to obtain the optimal moisture content before to feeding it to the gasifier 120. If such mixing is required, a mixing hopper can be used to mix the dry and wet materials together. The wet material can be conveyed from the sewage sludge storage to the mixing hopper prior to the delivery to the gasifier 120. The conveying distance can be approximately 60 feet, and depends upon the size and layout of the plant.

The gasifier 120 can convert the carbonaceous materials in the partially dried sewage sludge into a gaseous fuel, or syngas, by applying heat typically between about 600° F. and about 1,000° F. in an oxygen-starved environment. In another embodiment, the gasification temperature can be between about 1100° F. to about 2450° F. The gasification temperature can be varied to obtain different product profiles, and can be selected from about 1100° F., about 1200° F., about 1500° F., about 2350° F., and 2450° F.

Gasification produces a gaseous fuel called syngas. Syngas is made up of primarily hydrogen and carbon monoxide, with lesser amounts of other gaseous constituents. The amount of air or oxygen available inside the gasifier 120 can be carefully controlled so that only a relatively small portion of the fuel burns completely. This controlled process can provide heat for subsequent reactions. Rather than burning, most of the carbon-containing materials in the sewage sludge are chemically broken apart by the heat inside the gasifier 120, setting into motion the chemical reactions that produce the syngas. Because of the amount of heat generated from gasification, the gasifier 120 also assists in drying the sewage sludge prior to producing the syngas. The oxygen levels in the gasifier 120 can be from about 0% to about 40%, and preferably between about 5% and about 10%. Further, complete oxygen starvation can also be employed in gasification of sewage sludge if desired. Complete oxygen starvation is known as pyrolysis.

One skilled in the art will recognize that various types of gasifiers can be used to gasify sewage sludge, including but are not limited to, a rotary, retort cell, fixed-bed or fluidized-bed type gasifier. Depending upon the circumstances the gasifier can be a fixed bed gasifier, a moving bed gasifier, a rotary kiln gasifier, a fluidized bed gasifier, an upflow gasifier, or a downflow gasifier.

The solid minerals in the sewage sludge (e.g., rocks, dirt, and other impurities) separate and leave the bottom of the gasifier 120 as an inert ash that can be safely handled in a number of ways, including beneficial re-use of the ash as a marketable solid product. Only a small fraction of the mineral matter is carried out of the gasifier 120 as fly ash and can require removal downstream in the air pollution control device. The ash generated by the gasifier 120 can be cooled and conveyed via the ash removal system 125 to an ash storage tank prior to being transported off-site. The length of the conveyor necessary to move the ash can be about 20 feet to about 30 feet, or any other desirable length depending upon the size and layout of the plant. The conveyor can feed a bucket elevator that takes the material to the top of the storage tank to feed it into the tank.

The syngas produced by the gasifier 120 can be sent to a low NOx oxidizer 130. Air is injected into the low NOx oxidizer 130 in stages to combust the syngas to produce hot flue gas. This combustion is a staged process that is specifically designed to reduce the amount of NOx [i.e., compounds containing nitrogen and oxygen (e.g., NO, $NO_2$ and $N_2O$)] produced in the flue gas from the combustion of the syngas. The low NOx oxidizer 130 can run at a temperature of about 1500° F. to about 1800° F. The low NOx oxidizer 130 can be situated directly above, along side or after the gasifier 120 at the end where the resulting syngas exits.

The hot flue gases generated from the combustion of the syngas in the oxidizer 130 can be sent through an air-to-air heat exchanger 135, where the temperature of the flue gases is reduced to a level that protects the downstream air pollution control equipment. Clean air is heated to the appropriate temperature required by the dryer 110. The heated clean air from the heat exchanger 135 can be used directly or indirectly to dry additional sewage sludge in the dryer 110 in lieu of supplying energy to the dryer with auxiliary, non-renewable fuel. Accordingly, the syngas produced from the gasification of the partially dried sewage sludge ultimately can be used to provide the energy needed to dry the wet sewage sludge in the dryer 110. Thus, the system of the invention is able to capture the energy in the sludge and use it in process to perpetuate the process itself. Depending on the plant layout and size, the duct bringing the heated, clean air from the air-to-air heat exchanger 135 to the dryer 110 can be approximately 20 to 50 feet.

Returning to the initial drying step, a certain amount of VOCs and/or residual pathogens can be released into a moisture-laden gas stream emitted from the dryer 110. In order to meet air pollution control regulations, the moisture-laden gas stream off the dryer 110 then will be mixed with the flue gas after it exits the heat exchanger 135, and ducted directly to the pathogen destruction furnace 145. The pathogen destruction furnace 145 can destroy any residual pathogens and/or VOCs coming off the dryer 110. Depending upon the layout and size of the plant, the ducting can be about 30 feet to about 50 feet in length, or of any desirable length. The pathogen destruction furnace 145 can be of any known type capable of reducing the amount of residual pathogens and/or VOCs to a level within the regulatory limits of the facility's air permits. The pathogen destruction furnace also treats cooled flue gas obtained by combusting the syngas and cooling the resultant flue gas.

Because most municipal sewage sludge materials contain sulfur compounds (which can generate SOx when combusted or otherwise treated), the pathogen destruction furnace 145 can also function as a gas scrubbing device to remove any acid gases produced from the process. A lime injection system 140 can introduce lime into the cooled flue gases in the pathogen destruction furnace 145 to reduce the amount of SOx (i.e., compounds that contain sulfur and oxygen, and in particular, emissions containing $SO_2$ and $SO_3$) and any other acid gases that are generated during combustion. The lime injection system 140 can be placed above or next to the pathogen destruction furnace 145, and can feed lime through a rotary air lock to the pathogen destruction furnace 145, where the lime can scrub the gases.

After treatment in the pathogen destruction furnace 145, the scrubbed gases can be moved through an air pollution control device 150. The air pollution control device 150 controls the amount of particulate emissions. The ducting between the pathogen destruction furnace 145 and the air pollution control device 150 can be about 15 feet in length, depending upon the size and layout of the particular plant. After treatment in the air pollution control device 150, the gases are routed to the stack via ducting that can be about 25 feet in length, and exit the system through the stack 155.

Other embodiments of the invention relate to the calorific value of energy produced during gasification of the sewage sludge compositions. If the energy contained in the sewage sludge is greater than what was needed for drying, the excess energy in the hot flue gas off the low NOx oxidizer 130 can be used to create electricity. This is done by using the excess clean hot air off the heat exchanger 135 in a waste heat boiler to generate steam to drive a turbine or using the excess clean hot air off the heat exchanger 135 directly to drive a turbine. In addition, the syngas generated off the gasifier 120 can be cleaned and burned directly in an internal combustion engine to create electricity or used to fire the dryer 110.

In one embodiment, the hot flue gas generated from the combustion of the syngas in the low NOx oxidizer 130 can also be used directly to dry the sewage sludge in the dryer 110. After the hot flue gas is sent through the heat exchanger 135 to reduce the temperature of the flue gas the flue gas can be used directly to dry the sewage sludge in the dryer 110 in lieu of using the heated clean air from the heat exchanger 135.

In addition, as described above, water and volatile organic compounds can be condensed out of the vapor stream and discharged back to a municipality's waste water treatment plant. A condenser can be included to condense the moisture and volatile organic compounds from the gas stream off the dryer 110 and the condensed liquid can be fed back to the waste water treatment plant. Any non-condensable gases can be fed to the gasifier 120 or the low NOx oxidizer 130. This process may conserve energy because the pathogen destruction furnace 145 is not required to burn off any VOCs that can come off the dryer 110, assuming pathogen and/or VOCs are present.

Turning to the gasification process itself, during gasification most of the volatile matter in the sludge is converted to synthesis gas (syngas) that contains hydrogen ($H_2$), carbon monoxide (CO), carbon dioxide ($CO_2$), and water vapor ($H_2O$). The nitrogen ($N_2$) content in the syngas depends upon whether air or oxygen is used in the gasification step. Trace amounts of methane ($CH_4$) and higher hydrocarbons can also be present. Hydrogen sulfide ($H_2S$) can also be formed depending upon the sulfur content of the feed sludge. The hot spent char/ash exits the gasifier for ultimate disposal or beneficial use.

In addition, gasification conditions can be altered so that the gasification under different conditions produces different products. For example, at least five different gasification processes employ different temperatures and/or oxygen/air levels, and result in different gasification product profiles.

Dried Sludge—Thermal gasification of part of the digested sludge stream is used to generate energy to dry the rest of the sludge. After drying the ash/slag and the dried sludge streams can be blended together. While the advantage is that much of the original organic (fertile) fraction of the dried sludge remains intact, the disadvantage can include the possibility that Class A or B category of sludge for beneficial use may not be achieved. This process can employ, for example, a temperature of about 1200° F.

Biosolids—Partial thermal gasification of whole digested sludge stream can yield product for land application. While the advantage is that all of the feed sludge has been exposed to elevated temperatures, which destroys pathogens and results in an essentially sterile product, the disadvantage can include that much of the original organic fraction is destroyed. This destruction can yield a sterile char/ash product, requiring additional nutrients in order to generate a fertile soil amendment. This process can employ, for example, a temperature of about 1100° F.

Soil Amendment/Fertilizer—More extensive thermal gasification of whole digested sludge stream can yield minerals for use as fertilizer. Advantages include a sterile product with no organic material (e.g., fertilizer). Another advantage of this process is the high level of production of electric power, which can then be stored and/or exported. This process can employ, for example, a temperature of about 1500° F.

Fill—Complete gasification of whole digested sludge stream can yield slagged ash for construction fill. Advantages include maximum volume reduction, possible alternate construction use/application, and a sterile product. Another advantage is the production of electric power, which can be stored and/or exported. This process can employ, for example, a temperature of about 2450° F.

Complete gasification of whole sludge stream with addition of modifier minerals can yield slagged ash with pozzolanic properties (i.e., cement extending properties, when combined with calcium hydroxide, e.g., CEMENT-LOCK® Technology, Volcano Partners, L.L.C.). Advantages include the use of treated material as partial replacement for Portland cement in concrete and possible power generation for export. This process can employ, for example, a temperature of about 2350° F.

The oxygen levels of these five processes can also be varied from about 0% oxygen to about 40% oxygen. Preferably the oxygen level is from about 5% oxygen to about 10% oxygen. The lower oxygen levels will cause a more complete chemical breakdown of sewage sludge with the most useful products, a lower cost, and/or fewer noxious by-products. Although each of these five gasification parameters result in useful products, gasification at about 1500° F. unexpectedly results in a significantly higher level of useful products with fewer byproducts and lower costs.

While the specification has exemplified above the inventive methods and systems using sewage sludge as the feedstock, one skilled in the art would understand that the invention can be applied to a wide variety of other biomaterials. Biomass materials can include, for example, bovine, swine, and poultry litters or manures, as well as poultry, bovine, or other animal carcasses. The invention can be applied to agricultural by products and waste, bitumen, can coal tailings, industrial waste, and medical waste.

The following Examples illustrate several embodiments of the invention.

EXAMPLES

Example 1

Task 1. Municipal Sewage Sludge Feedstock Characterization

The first task was an experimental task performed in order to chemically characterize a sample of municipal sewage sludge and to conduct thermal gasification tests. The thermal gasification tests were performed to determine the rate of sludge gasification under a range of conditions. A representative sample (about 10 gallons) of digested municipal sewage sludge from a local wastewater treatment facility was obtained. The sample was weighed, dried, crushed, riffled, and analyzed. The complete chemical analyses included proximate, ultimate, particle size distribution, bulk density, ash fusion temperatures (under oxidizing and reducing atmospheres), major and minor components in ash, and gross calorific value.

Based on the results of the chemical characterization tests, operating conditions to characterize the gasification characteristics of the sewage sludge sample were determined. This included two tests in a high-pressure thermogravimetric analyzer (TGA) to determine the relative reactivity of the sample supplied.

Fuel Reactivity Test

This test measures the dried sewage sludge reactivity for gasification. Results from the TGA testing compared the rate of gasification of the sludge sample with a database of coal and biomass samples that were processed and tested in a fluidized bed process. One of skill in the art would understand that the type of gasifier employed is not limited by the results of these tests.

Figure 3:
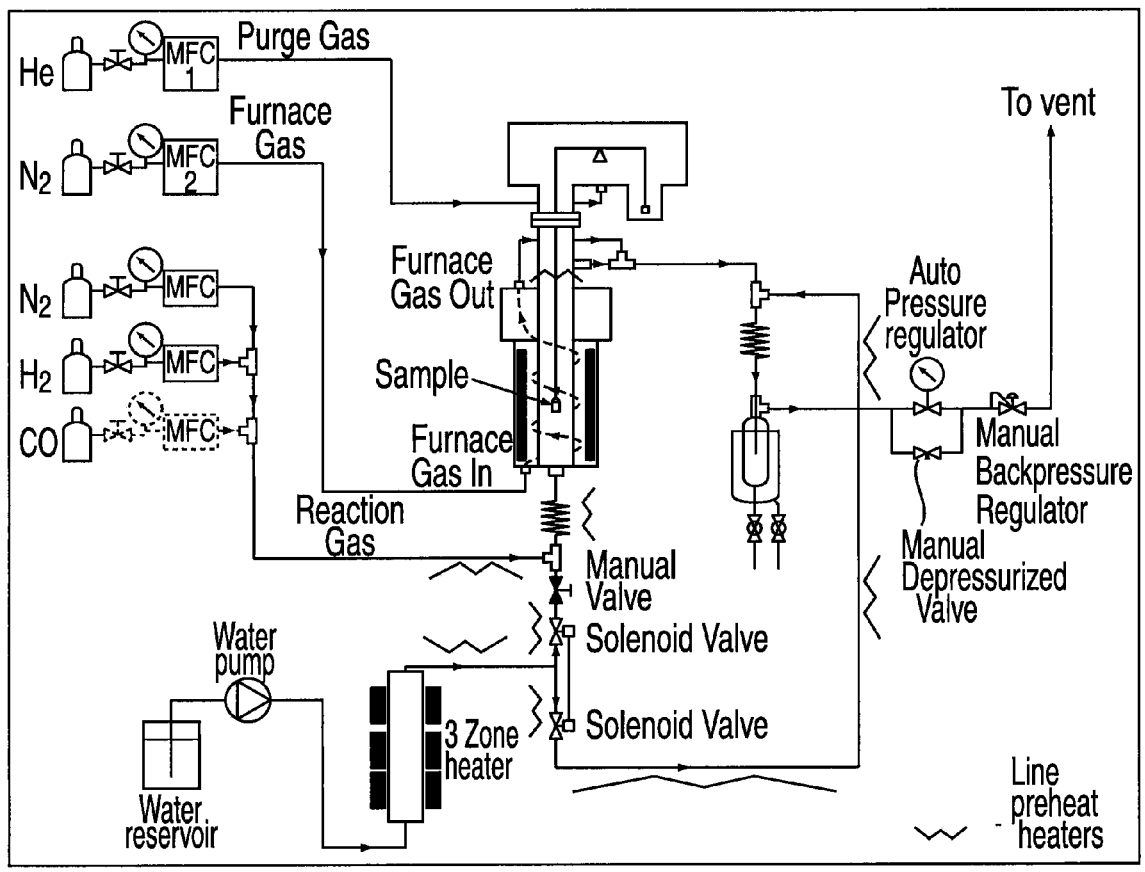
FIG. 3 depicts a thermogravimetic analyzer (TGA) Schematic Diagram.

FIG. 3 depicts a schematic diagram of one of a high-pressure/high-temperature TGA units. A TGA unit can provide operating at temperatures over 2000° F. and pressures up to 1000 psia. All the hot, wetted parts of the unit can be made of quartz to eliminate potential reactions with corrosive and reactive gases, which can result in the loss of the reactant species in the gas phase. A TGA unit is capable of continuously weighing a sample that is undergoing reaction in a gaseous environment of desired composition at constant pressure. The temperature can be kept constant or varied at a desired rate. The gas flow rates used with this system are sufficiently large relative to the reaction rate such that the gas composition is essentially constant.

In the TGA test, a platinum wire mesh basket or ceramic basket containing the sample (100-200 mg) was loaded and inserted into the reactor. These specific tests used a platinum wire mesh basket. Here, the test was initiated by establishing gas flow and setting the pressure via a software application. Temperature heat-up rate and final temperature were also programmed prior to initiation of the test. Weight was continually monitored and recorded as the solid sample reacts with the gas. The test was terminated when the sample weight reaches a constant value (no weight loss or gain) over time.

The feed gas mixture was prepared by measuring and controlling the flow rates of each gas in several streams using mass flow controllers. A backpressure control valve maintained the system pressure. Thermocouples were used to measure the temperature in the vicinity of the basket. A computerized data acquisition system collected the experimental data—including sample weight, pressure, temperature, and flow rates of different streams—and stored this information on disk for further analysis. The test results were used to determine the relative reactivity of the sample of sewage sludge.

Based on the results, an appropriate pressure to be utilized in a proposed TGA test based on end use (e.g., electric power generation, chemical by-products) was determined. The sample was devolatilized prior to the test, because the char (or least reactive portion of a sample) was the limiting rate for subsequent gasification reactions.

Carbon Conversion Calculations

Figure 4:
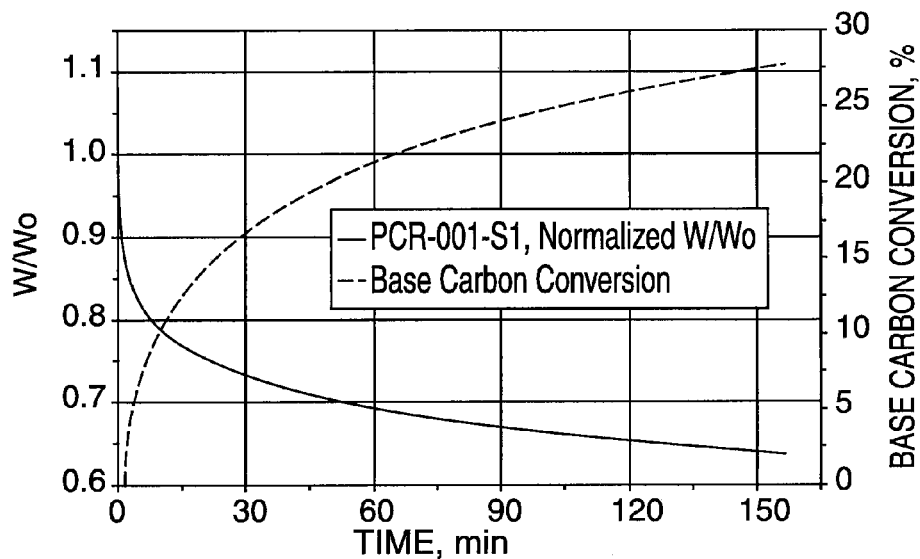
FIG. 4 depicts an illustration of typical TGA results.

Base carbon is defined as the portion of carbon in the sample remaining after devolatilization (i.e., removal of volatile material) is complete. The equation below was used to develop the base carbon conversion graphs. Test results were presented graphically in terms of dimensionless weight (weight of the reacting sample at any time during the test over the initial weight of the fresh sample, $W/W_o$) and base carbon conversion versus time, as indicated in FIG. 4. Proximate analysis fractions of the feed [moisture (M), volatile matter (VM), ash (A), and fixed carbon (FC)] were used to estimate the base carbon conversion in the TGA reactivity evaluation tests. Base carbon conversion (X) is defined as:

$$X = \left[ \frac{FC + A - \frac{W}{W_O}}{FC} \right] \times 100$$

where,
FC=fixed carbon fraction in the TGA test feed sample
A=ash fraction in the TGA test feed sample
$W_o$=initial weight of the TGA test feed sample
W=weight of reacting sample at a given time during the TGA test.

Results

A representative sample was from the original 10-gallon sample and used for taken for analyses and tests. Ash and total moisture content were determined and Table 1 shows this data.

TABLE 1

Ash and Moisture Content of Composite Sludge Sample

|  | Digested Sewage Sludge Composite of #1 and #2 |
|---|---|
| Total Moisture, wt % | 34.99 |
| Ash (550° C.), wt % | 26.65 |

Two samples were subjected to devolatilization in a nitrogen atmosphere at 1500° F. and 1100° F. Results of proximate analyses for the devolatilized samples are shown in Table 2.

TABLE 2

Proximate Analysis of Devolatilized Samples of Sewage Sludge

| | Devolatilized Sewage Sludge Sample | | | |
|---|---|---|---|---|
| | 1500° F. | | 1100° F. | |
| Moisture, % | 2.23[1] | 0[2] | 0.42[1] | 0[2] |
| Volatile Matter, % | 9.70 | 9.92 | 18.68 | 18.76 |
| Ash (750° C.), % | 84.86 | 86.80 | 73.44 | 73.75 |
| Fixed Carbon, % (by diff.) | 3.21 | 3.28 | 7.46 | 7.49 |

[1]Values for volatile matter, ash, and carbon were calculated assuming zero moisture.
[2]Sample re-absorbed moisture after devolatilization and prior to analysis Tables 3 and 4 below show the results of the analysis of the dried and devolatilized sludge samples and the conversion of each ultimate element during devolatilization. During the devolatilization procedure, the sludge sample is subjected to a high temperature in a nitrogen environment. Typical reactions occurring during devolatilization include carbon dioxide ($CO_2$) evolution (from decarboxylation of organic acids), and formation of water, tar, ammonia ($NH_3$), hydrogen sulfide ($H_2S$), and heavier hydrocarbons.

TABLE 3

Ultimate Analysis of the Digested Sewage Sludge Sample (ASTM D5373) - 1500° F.

| | Raw Sludge as-received | Raw Sludge Devolatilized at 1500° F. | Conversion During Devolatilization, % |
|---|---|---|---|
| Ash (550° C.), % | 41.00 | 86.80 | 0.0 |
| Carbon, % | 32.60 | 7.96 | 88.47 |
| Hydrogen, % | 4.36 | 0.25 | 97.29 |
| Nitrogen, % | 4.75 | 0.48 | 95.23 |
| Sulfur, % | 1.44 | 1.45 | 52.44 |

TABLE 3-continued

Ultimate Analysis of the Digested Sewage Sludge Sample (ASTM D5373) - 1500° F.

| | Raw Sludge as-received | Raw Sludge Devolatilized at 1500° F. | Conversion During Devolatilization, % |
|---|---|---|---|
| Oxygen, % (by diff.) | 15.85 | 3.06 | 90.88 |

TABLE 4

Ultimate Analysis of the Digested Sewage Sludge Sample (ASTM D5373) - 1100° F.

| | Raw Sludge As-received | Raw Sludge Devolatilized at 1100° F. | Conversion During Devolatilization, % |
|---|---|---|---|
| Ash (550° C.), % | 41.00 | 73.75 | 0.0 |
| Carbon, % | 32.6 | 15.09 | 74.27 |
| Hydrogen, % | 4.36 | 0.49 | 93.75 |
| Nitrogen, % | 4.75 | 1.90 | 77.76 |
| Sulfur, % | 1.44 | 1.36 | 47.50 |
| Oxygen, % (by diff.) | 15.85 | 7.41 | 74.01 |

The ash fusion temperatures were determined in both reducing and oxidizing atmospheres and are shown in Table 5 below.

TABLE 5

Ash Fusion Temperatures for Sewage Sludge Sample (ASTM D1857)

| | Reducing Atmosphere | Oxidizing Atmosphere |
|---|---|---|
| Initial Deformation, ° F. | 2060 | 2160 |
| Softening, ° F. | 2110 | 2190 |
| Hemispherical, ° F. | 2140 | 2220 |
| Fluid, ° F. | 2200 | 2270 |

The quantity of ash present in the feed sludge was assumed to remain constant; therefore the conversion of ash is shown as zero.

The gross calorific value of the sewage sludge sample was determined to be 5,740 Btu/lb (ASTM D5865). The mercury (Hg) content in raw sewage sludge sample was determined to be 1.41 µg/g (or ppm).

Table 6 shows the major and minor components of ash as determined. The values are reported for a sample of sewage sludge that was ashed at 550° C. (1022° F.).

TABLE 6

Major and Minor Oxides in Sewage Sludge Ash (ASTM D6349)

| Element | As Analyzed, % | As Oxide | Amount, % | Normalized, % |
|---|---|---|---|---|
| Si | 18.89 | SiO$_2$ | 40.40 | 42.57 |
| Al | 4.80 | Al$_2$O$_3$ | 9.08 | 9.56 |
| Fe | 4.92 | Fe$_2$O$_3$ | 7.04 | 7.42 |
| Mg | 2.84 | MgO | 4.70 | 4.96 |
| Ca | 10.33 | CaO | 14.45 | 15.22 |
| Ti | 0.98 | TiO$_2$ | 1.63 | 1.72 |
| K | 1.40 | K$_2$O | 1.68 | 1.77 |
| P | 4.54 | P$_2$O$_5$ | 10.40 | 10.96 |
| Na | 0.55 | Na$_2$O | 0.74 | 0.77 |
| Mn | 0.12 | MnO$_2$ | 0.19 | 0.20 |
| Ba | 0.14 | BaO | 0.16 | 0.17 |

TABLE 6-continued

Major and Minor Oxides in Sewage Sludge Ash (ASTM D6349)

| Element | As Analyzed, % | As Oxide | Amount, % | Normalized, % |
|---|---|---|---|---|
| Sr | 0.03 | SrO | 0.04 | 0.04 |
| S | 1.77 | SO$_3$ | 4.41 | 4.64 |
| Total | — | — | 94.92 | 100.00 |

Devolatilization Procedure

The bulk of the moisture was removed from the sludge sample by drying in a muffle furnace in flowing air prior to analyses or testing.

Samples of dried sewage sludge were devolatilized in a laboratory Thermogravimetric Analyzer (TGA) in flowing nitrogen at about 1500° F. (816° C.) and about 1100° F. (593° C.). A known mass of sample was heated under nitrogen while the weight loss was continuously monitored with a calibrated balance during a programmed temperature rise. Moisture was determined as the weight lost from about 220° F. (104° C.) to 230° F. (110° C.). Typical conditions were used: a heat-up rate of 9° F. (5° C.) per minute to the target temperature, then hold at that temperature for 1 hour. Following the devolatilization, the sample was cooled to 212° F. (100° C.) over a four-hour time period under nitrogen purge.

The ultimate and proximate analyses reported above were conducted according to ASTM Method D5373 "Standard Test Methods for Instrumental Determination of Carbon, Hydrogen and Nitrogen in Laboratory Samples of Coal and Coke" and ASTM Method D5142 "Standard Test Methods for Proximate Analysis of the Analysis Sample of Coal and Coke by Instrumental Procedures." The elemental compositions of the coal, as determined from the proximate and ultimate analyses, were needed for carbon and other elemental component conversion calculations.

Sludge Thermogravimetric Analysis Tests

Figure 5:
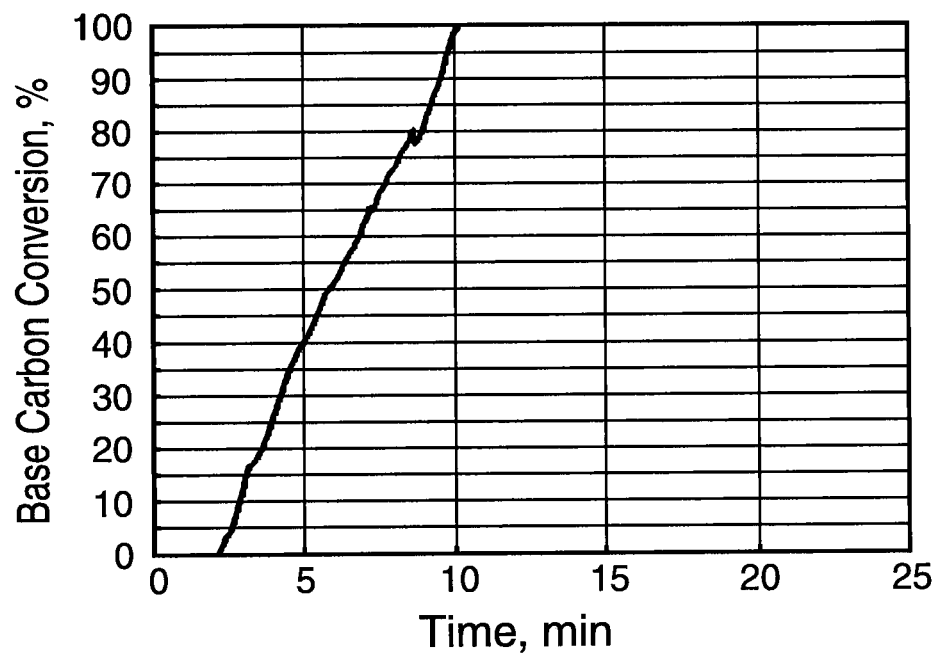
FIG. 5 depicts an illustration of TGA results at a temperature of about 1500° F.
Figure 7:
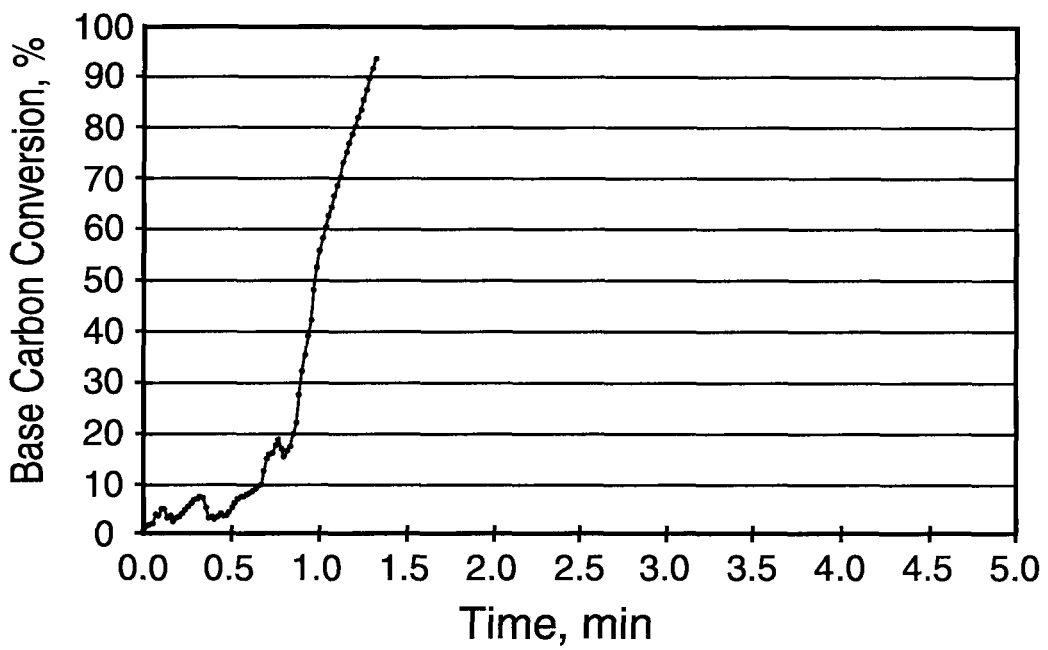
FIG. 7 depicts an illustration of TGA results at a temperature of about 1100° F.

The sludge reactivity tests were conducted in a high-pressure Thermogravimetric Analyzer (TGA). The high-pressure TGA is illustrated in FIG. 3. The TGA tests were conducted using 50% hydrogen/50% steam mixture at 30 psig and two different temperatures: 1500° F. and 1100° F. The results of these tests are shown in FIGS. 5 and 7. As shown in FIG. 5, the total reaction time was about 10 minutes at 1500° F. As shown in FIG. 7, the total reaction time for a second TGA test was just under 2 minutes at 1100° F. The longer reaction for the lower temperature test was due to a lower carbon content (~8%) during devolatilization of the sludge sample at 1500° F. The TGA microgravimetric method is unable to detect anything smaller than 1 mg at total sample weight of 100 mg. The results of the TGA test conducted at 1100° F. were considered to be more reliable due to the higher carbon content in the sample. The sample devolatilized at 1100° F. had a carbon content of about 15%.

Figure 6:
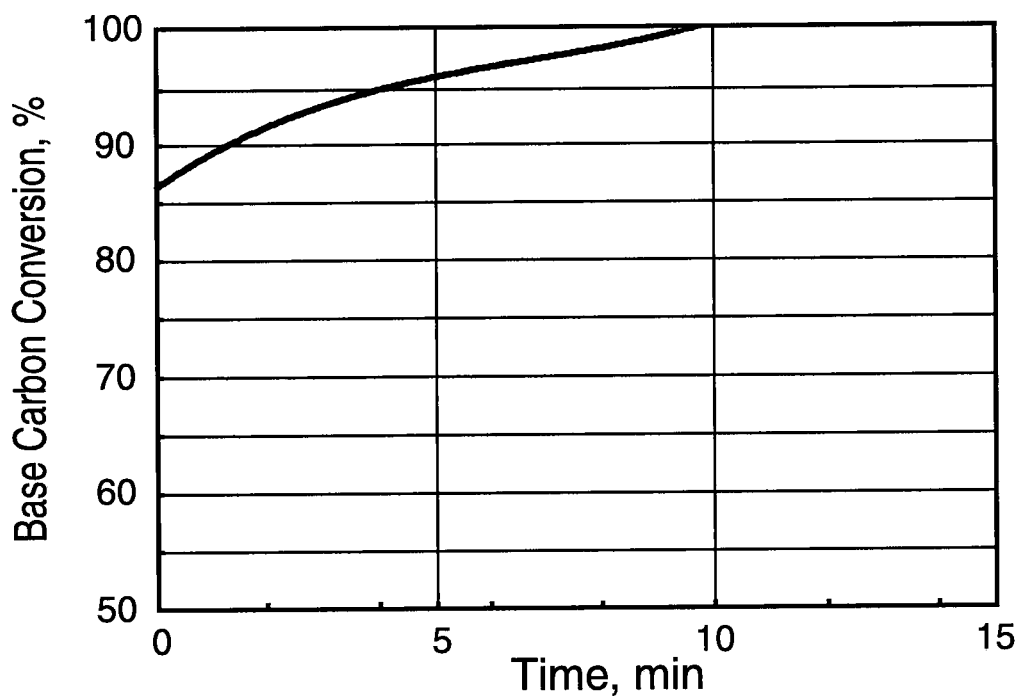
FIG. 6 depicts an illustration of total carbon conversion at a temperature of about 1500° F.
Figure 8:
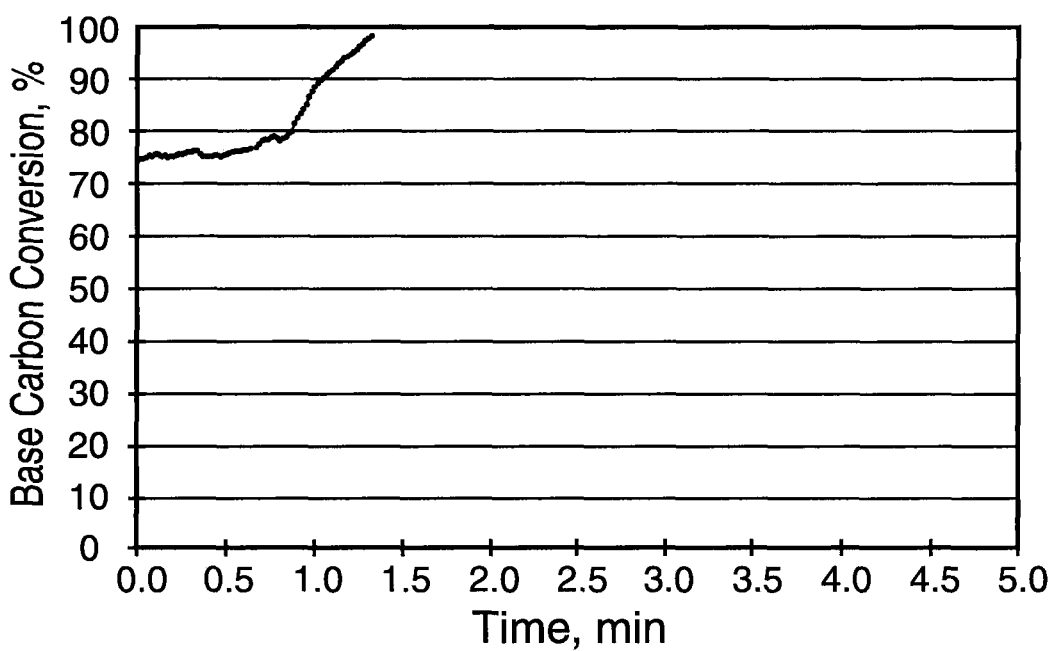
FIG. 8 depicts an illustration of total carbon conversion at a temperature of about 1100° F.

The results shown in FIGS. 6 and 8 show the kinetics of total carbon conversion (after devolatilization and TGA test). Carbon conversion during the devolatilization process was taken as the initial value for the TGA total carbon conversion. The total carbon conversion (devolatilization plus TGA test) was about 100% in both cases.

The initial data points recorded by the TGA for base carbon conversions showed some variability, especially in the first 30 seconds, which might have been due to the small amount of carbon in the samples. Typical coal or biomass chars are generally much higher in carbon content. Nevertheless, based on reaction time and carbon conversion values, the sludge sample was very reactive.

Because the sewage sludge had high reactivity compared with other feedstocks with lower reactivity, the gasifier size was smaller. For a gasifier of comparable size, the sludge throughput capacity of the gasifier would be higher with lower solids residence time.

Example 2

The primary objective of this task was to develop a model of the gasification using the ASPEN PLUS® process simulation software. The technology was simulated in ASPEN PLUS® at a digested sludge feed rate of 10 tons per hour (wet basis). The ASPEN PLUS® process simulation software allows for the estimation of the material and energy balances for the technology under five different operating cases, as described above. The five operating cases include gasification at five different temperatures, which result in different gasification products. Specifically, these five cases include gasification at 1200° F., 1100° F., 1500° F., 2450° F., and 2350° F., respectively.

The ASPEN PLUS® process simulation software was used to develop a model of the gasification technology. For the base case simulation, a digested sludge feed rate of 10 tons per hour (wet basis) was selected. Also, the sludge was received at the gasification plant with a moisture content of about 65 wt (35 wt % solids content).

A short-term sludge storage hopper 101 and crusher/comminutor 102, as shown in FIG. 1, allowed for a continuous gasification process without running out of raw materials. Dewatered digested sludge was delivered to the gasification facility and unloaded from the transport into temporary storage prior to processing. On-site sewage sludge storage was provided to ensure a steady supply of sludge to the plant in the event of interrupted sludge delivery. These pieces of equipment, while necessary for a continuous process flow, do not affect the gasification process itself.

In addition, the feed sludge can be divided into two streams. The first stream was directed to the sludge dryer 110 and dried to about nominal 15 wt % moisture. The second stream—the balance of the raw wet sludge feed—was directed to the sludge gasifier. The type of gasifier (e.g., fixed bed, moving bed, rotary kiln, fluidized bed, upflow, downflow) was not specified in the process simulation and can be a design choice made by one skilled in the art.

A portion of the dried sludge was blended with the raw wet sludge to achieve a conveyable mixture. In a different embodiment, all of the feed sludge was directed to the dryer. The results of the ASPEN PLUS® modeling work are summarized in Table 7. Table 7 also includes an estimate of the steam generation potential and the electric power generation potential from each of the five operating cases. The temperature of the flue gas exiting the stack was either 400° F. or 250° F. The lower stack temperature represented a more efficient case. The conversion of steam energy to electric power was conservatively assumed to be 30%. The results in Table 7 show that Case 3 (Soil Amendment/Fertilizer) was the highest potential gross electric power production (1.9 MW (megawatts)) compared to the other cases.

TABLE 7

Summary of Results of ASPEN PLUS ® Process Modeling of the Gasification Technology

| | Test Cases Case No. | | | | |
|---|---|---|---|---|---|
| | 1 | 2 | 3 | 4 | 5 |
| Description | Dried (15% M.C.) Sludge + Gasified Ash Mixture | Limited Sludge Gasification | More Complete Sludge Gasification | Slagging Mode Gasification | Slagging Mode Gasification with Modifiers |
| Total Sludge Fed, ton/hr | | | 10 | | |
| Moisture Content, wt % | | | 65 | | |
| Gasification Temperature, ° F. | 1200 | 1100 | 1500 | 2450 | 2350 |
| Gasification Pressure, psig | | | 15 | | |
| Calorific Value of Synthesis Gas (HHV) Produced, Btu/ft$^3$ | 122.8 | 117.6 | 110.1 | 39.5 | 46.3 |
| Carbon Conversion, % | 95.0% | 94.0% | 95.2% | 100.0% | 100.0% |
| Product Rate, lb/hr | | | | | |
| Dried Sludge, 15 wt % moisture | 4,571 | 0 | 0 | 0 | 0 |
| Ash, lb/hr (dry) | 3,020 | 3597 | 2912 | 2860 | 2860 |
| Total Product, lb/hr | 7,591 | 3,597 | 2,912 | 2,860 | 2,860 |
| Stack (flue gas) Temperature, ° F. | | | 400 | | |
| Air Blower, HP | 624 | 1110 | 1469 | 1377 | 1382 |
| Energy for Export, MM Btu/hr | 0.075 | 11.2 | 18.4 | 16.7 | 16.8 |
| Steam Rate, lb/hr | 60 | 8,990 | 14,830 | 13,420 | 13,50 |
| @ 1244 Btu/lb or | | | | | |
| Power Generation, MW Efficiency 30% | 0.01 | 0.98 | 1.62 | 1.47 | 1.48 |
| Stack (flue gas) Temperature, ° F. | | | 250 | | |
| Air Blower, HP | 624 | 1110 | 1469 | 1377 | 1382 |
| Energy for Export, MM Btu/hr | 1.4 | 13.6 | 21.6 | 19.7 | 19.8 |
| Steam Rate, lb/hr | 1,130 | 10,910 | 17,340 | 15,800 | 15,880 |
| @ 1244 Btu/lb or | | | | | |
| Power, MW Efficiency 30% | 0.12 | 1.19 | 1.90 | 1.73 | 1.74 |

Each of the five operating cases was modeled using the ASPEN PLUS® system, and these cases are described in greater detail below.

Dried Sludge Product—All of the raw wet feed sludge was directed to the dryer to be dried to minimum of about 15 wt % moisture because lower moisture contents resulted in spontaneous ignition and possible dust explosions. A portion of the dried sludge feed was gasified to generate synthesis gas with a calorific value of about 122.8 Btu/ft$^3$. This low-Btu gas was burned to generate heat to dry the rest of the sludge. The sludge was gasified at a temperature of about 1200° F. In this simulated case, the quantity of sludge gasified amounts to about 8,900 pounds or about 44.5% of the total feed sludge. The dried sludge and gasified ash/slag were blended together to yield the product, which can then be used as a soil amendment or as fill. A total of about 7,591 lb/hour of dried/gasified sludge mixture was produced.

Biosolids—In this case, all of the digested sludge was directed to the dryer, and then to the gasifier. The gasification reactions were carried out at a less severe temperature of about 1100° F. At this temperature, the sludge gasification rate was generally rapid. The calorific value of the synthesis gas can be about 118 Btu/ft$^3$, which was burned to generate heat to dry the sludge. A total of about 3,597 lb/hour of gasified sludge was produced. Thermal gasification of the whole digested sludge stream can yield a product for direct land application or for fill. An advantage was that all of the feed sludge was exposed to elevated temperature to destroy pathogens, yielding an essentially sterile product. A disadvantage was that much of the original organic fraction was destroyed. This destruction yielded a sterile char/ash product, which can need addition of nutrients to generate a fertile soil amendment.

Soil Amendment/Fertilizer—All of the digested sludge was directed to the dryer, and then to the gasifier. The gasification reactions were carried out at a more severe temperature of about 1500° F. The calorific value of the synthesis gas was about 110 Btu/ft$^3$, which was then burned to generate heat to dry the sludge. A total of about 2,912 lb/hour of gasified sludge was produced. More severe thermal gasification of whole digested sludge stream yielded material for soil amendment (additional nutrients can be required for fertilizer). The gasified sludge was suitable for admixing with other materials in the production of concrete. Advantages were that the product was sterile and that it contained no organic material. Depending upon the final mineral composition, there was a potential for generating suitable materials for soil amendment, fertilizer, or building materials.

Fill—In this case, all of the digested sludge can be directed was dryer, and then to the gasifier. The gasification reactions were carried out at a more severe temperature of about 2450° F. to ensure that all of the mineral matter were brought to a molten state. The molten material flowed from the slagging gasifier and exited the system in the form of slag. Depending upon the quenching system used, the slag was either granular in nature and or suitable for fill. Slag with suitable properties could be used as aggregate in the production of concrete. The calorific value of the synthesis gas was about 40 Btu/ft$^3$, which led to unstable combustion and required supplemental fuel to raise the Btu value of the product gas. A total of about 2,860 lb/hour of gasified sludge was produced. Complete gasification of whole digested sludge stream yielded slagged ash for construction fill. Advantages included maximum volume reduction, possible alternate construction use, and a sterile product.

Pozzolanic Product—In this case, all of the digested sludge was directed to the dryer and then to the gasifier. The gasification reactions was carried out at a slightly less severe temperature of 2350° F., because modifier minerals (minerals common to the Portland cement industry) were used to decrease the melting temperature and reduce slag viscosity. The molten slag was quenched in water in the form of small granules. The quenched slag had pozzolanic properties, which means that it can be used as a partial replacement for Portland cement in the production of concrete. (CEMENT-LOCK® technology (Volcano Partners, LLC) was used in the production of concrete. The calorific value of the synthesis gas was about 46 Btu/ft$^3$, which lead to unstable combustion. A total of about 2,860 lb/hour of pozzolanic product was produced. However, the addition of modifier minerals increased this product rate.

Potential for Electric Power Production

Because the technology used in gasification is a thermal technology, the potential exists for capturing heat from the system to produce steam for export. Similarly, the steam could be used to drive a generator to generate electric power. Some of the generated electric power could be used on-site for process needs. The process simulation software was used to estimate sizes of process equipment (pumps, motors, tanks, reactor vessels, heat exchangers, storage hoppers, etc.) required to generate a desired amount of electric power.

Under the gasification conditions tested, the sample of digested sewage sludge from the achieved nearly 100% carbon conversion in less than 10 minutes. Therefore, it was concluded that digested sewage sludge was amenable to gasification. The five operating cases described in this application resulted in different by-products: dried sludge/ash mixture, two gasified ash/chars, one slagged product, and one slagged product with pozzolanic properties. The third scenario, as described above, generated an ash by-product useable as fill or fertilizer depending upon its mineral content. This scenario also demonstrated the potential for generating 1.9 MW of electric power by recovering excess heat, converting that to steam, and using the steam to drive a generator. After satisfying on-site electric power needs, the balance of electric power could be exported to the grid for revenue (the other cases all generated less power). Overall, the gasification methods described in this application have the potential to effectively remediate municipal sewage sludge and convert it into a beneficial use material.

Prophetic Example

In order to characterize a sample of a biomaterial, thermal gasification tests on that biomaterial can be conducted. In one prophetic example, poultry litter (e.g., chickens or turkeys) can be put through the gasification protocol to obtain the desired syngas, along with energy and beneficial ash. The poultry litter can be dried and used as gasification feedstock. Thermal gasification tests can be performed to determine the rate of biomass gasification under a range of conditions. A representative sample poultry litter from a local poultry farm can be obtained, weighed, dried, crushed, riffled, and analyzed. A complete chemical analyses, including proximate, ultimate, particle size distribution, bulk density, ash fusion temperatures (under oxidizing and reducing atmospheres), major and minor components in ash, and gross calorific value can be determined in the same way as with sewage sludge.

Based on the results of the chemical characterization tests, operating conditions to characterize the gasification characteristics of the sewage sludge sample can be determined. A high-pressure thermogravimetric analyzer (TGA) can be used to determine the relative reactivity of the biomass sample supplied.

While various embodiments of the present invention have been described above, such disclosures have been presented by way of example only and are not limiting. Thus, the breadth and scope of the present invention should not be limited by any of the above-described exemplary embodiments, but should be defined only in accordance with the claims and their equivalents.

Having now fully described the invention, those of ordinary skill in the art would understand that the same can be performed within a wide and equivalent range of conditions, formulations and other parameters without affecting the scope of the invention or any embodiment thereof. All cited patents, patent applications and publications fully incorporated by reference in their entirety.

We claim:

1. A method for processing sewage sludge comprising the steps of:
   a. drying a first batch of sewage sludge comprising carbon-containing materials to form a first partially dried sewage sludge;
   b. gasifying a portion of the first partially dried sewage sludge into a gaseous fuel at a temperature of from about 1100° F. to about 1500° F. in an oxygen-starved environment containing about 0% to about 40% stoichiometric oxygen necessary for complete combustion, whereby the carbon-containing materials in the first partially dried sewage sludge chemically react to produce the gaseous fuel; and
   c. combusting the gaseous fuel in an oxidizer to produce a hot flue gas.

2. The method of claim 1, further comprising producing electric power from the hot flue gas.

3. The method of claim 1, further comprising the step of heating air with the hot flue gas.

4. The method of claim 3, further comprising the step of using the heated air to dry a second batch of sewage sludge to form a second partially dried sewage sludge.

5. The method of claim 4, wherein the heated air directly dries the second batch of sewage sludge.

6. The method of claim 4, wherein the heated air indirectly dries the second batch of sewage sludge.

7. The method of claim 1, wherein the oxygen-starved environment contains from about 5% to about 10% oxygen.

8. The method of claim 1, further comprising the step of destroying volatile organic compounds or residual pathogens in the flue gas.

9. The method of claim 1, further comprising the step of destroying residual pathogens in the flue gas.

10. The method of claim 1, further comprising the step of reducing SOx levels in the flue gas.

11. The method of claim 10, wherein the SOx levels are reduced by injecting lime into the flue gas.

12. The method of claim 1, further comprising the step of reducing particulate emissions in the flue gas.

13. The method of claim 1, wherein the drying step includes releasing a moisture-laden gas stream.

14. The method of claim 13, further comprising condensing moisture from the moisture-laden gas stream to produce a condensed liquid.

15. The method of claim 14, further comprising feeding the condensed liquid to a waste water treatment plant.

16. The method of claim 15, further comprising condensing volatile organic compounds from the moisture-laden gas stream.

17. A method for processing a sewage sludge composition comprising the steps of:
   a. digesting a first batch of sewage sludge comprising carbon-containing materials;
   b. drying the first batch of sewage sludge to form a first partially dried sewage sludge;
   c. gasifying a portion of the first partially dried sewage sludge into a gaseous fuel at a temperature of from about 1100° F. to about 1500° F. in an oxygen-starved environment containing about 0% to about 40% stoichiometric oxygen necessary for complete combustion, whereby the carbon-containing materials in the first partially dried sewage sludge chemically react to produce the gaseous fuel;
   d. combusting the gaseous fuel in an oxidizer to produce a hot flue gas; and
   e. reducing SOx levels in the flue gas.

18. The method of claim 17, further comprising producing electricity from the hot flue gas.

19. The method of claim 17, further comprising the step of heating air with the hot flue gas.

20. The method of claim 18, further comprising the steps of digesting a second batch of sewage sludge and drying the second batch of sewage sludge with the heated air to form a second partially dried sewage sludge.

21. The method of claim 20 wherein the heated air directly dries the second batch of sewage sludge.

22. The method of claim 20, wherein the heated air indirectly dries the second batch of sewage sludge.

23. The method of claim 17, wherein the oxygen-starved environment contains from about 5% to about 10% oxygen.

24. A system for processing sewage sludge, comprising:
   a. a dryer for partially drying the sewage sludge and releasing a moisture-laden gas stream;
   b. a gasifier for converting partially dried sewage sludge into a gaseous fuel;
   c. an oxidizer for combusting the gaseous fuel to produce heat and to substantially reduce NOx compounds, wherein the heat is used to directly or indirectly partially dry the sewage sludge in the dryer;
   d. a pathogen destruction furnace for destroying volatile organic compounds and/or residual pathogens released from the sewage sludge;
   e. a lime injection system for reducing SOx in the pathogen destruction furnace; and
   f. a condenser for condensing moisture and volatile organic compounds from the moisture-laden gas stream and conducting the condensed moisture to a waste water treatment plant.

25. A method for processing a sewage sludge composition comprising the steps of:
   a. digesting a first batch of sewage sludge comprising carbon-containing materials;
   b. drying the first batch of sewage sludge to form a first partially dried sewage sludge and releasing a moisture-laden gas stream;
   c. gasifying a portion of the first partially dried sewage sludge into a gaseous fuel at a temperature of from about 1100° F. to about 1500° F. in an oxygen-starved environment containing about 0% to about 40% stoichiometric oxygen necessary for complete combustion, whereby the carbon-containing materials in the first partially dried sewage sludge chemically react to produce the gaseous fuel;
d. combusting the gaseous fuel in an oxidizer to produce a hot flue gas;
e. injecting lime into the flue gas to reduce SOx levels in the flue gas;
f. heating air with the hot flue gas;
g. using the heated air to dry a second batch of sewage sludge to form a second partially dried sewage sludge;
h. destroying volatile organic compounds or residual pathogens in the flue gas;
i. reducing particulate emissions in the flue gas; and
j. condensing moisture and volatile organic compounds from the moisture-laden gas stream producing a condensed liquid and feeding the condensed liquid to a waste water treatment plant.

26. The method of claim 25, wherein the oxygen-started environment contains from about 0% to about 10% oxygen.

27. The method of claim 26, wherein the oxidizer operates at a temperature from about 1500° F. to about 1800° F.

28. The method of claim 27, wherein the oxygen-started environment contains from about 5% to about 10% oxygen.

29. The method of claim 28, further comprising producing electric power from the hot flue gas.

* * * * *